Nov. 22, 1955 J. N. MASON 2,724,670
LAMINATED PACKING
Filed Jan. 25, 1954
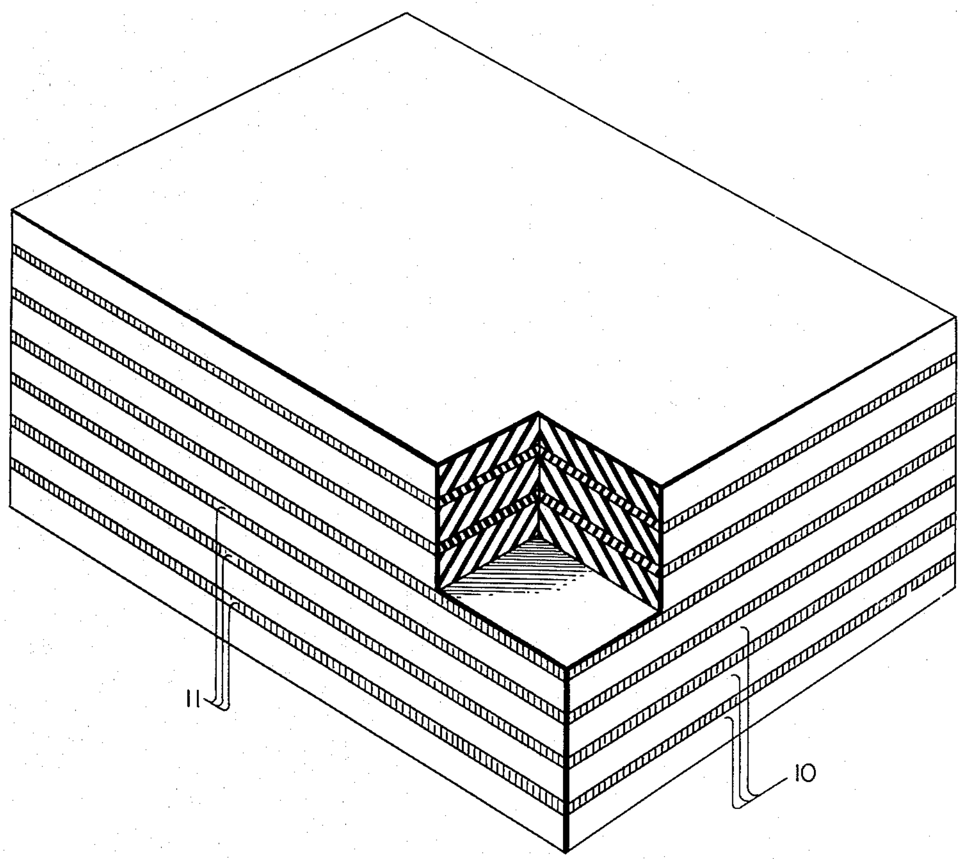
INVENTOR.
James N. Mason
BY
Kenway, Jenney, Witter & Hildreth.
Att'ys.

United States Patent Office 2,724,670

Patented Nov. 22, 1955

1

2,724,670

LAMINATED PACKING

James N. Mason, Winchester, Mass., assignor to Boston Woven Hose and Rubber Company, Cambridge, Mass., a corporation of Massachusetts Application January 25, 1954, Serial No. 406,019

1 Claim. (Cl. 154—52)

This invention comprises a new and improved laminated packing having desirable vibration-damping characteristics and thickness index indications that facilitate its preparation for use in various installations.

One field of use of the novel packing herein disclosed is as cushioning medium for machinery, for example, as a bolster for packing the die of a die press. It may be usefully employed, however, wherever a tough, waterproof, resilient packing is required, and in accordance with the present invention it is made conveniently available throughout a wide range of thicknesses. This is achieved by including in the body of the composite laminated packing thin colored layers of the packing material arranged as indices of thickness. For example, the solid body of the packing may be divided by colored layers into ¼ or ½" sections, and by following selected index layer, the packing may be cut into blocks or slabs of a single section or any desired multiple thereof.

The improved packing of this invention is given its highly effective vibration-damping characteristics by alternating layers of more dense packing material with layers of less dense material. In so constructing the packing advantage is taken of the fact that vibration waves travel at different speeds through media of varying density, and that the effect of the higher density layers is to set up a complex wave interference pattern which results in a marked degree of damping.

In accordance with the present invention the narrow colored striations may be compounded with a different density from the thicker layers of the packing material. It will therefore be seen that these layers have a double function in the composite packing, that is to say, they both indicate lines of division and form an effective part of the vibration-damping structure.

These and other features of the invention will be best understood and appreciated from the following description of a preferred embodiment thereof selected for purposes of illustration and shown in the accompanying drawing in which the figure is a view in perspective of a slab or block of packing showing one corner broken away.

The packing is herein shown as comprising seven relatively thick laminations or striations 10 of rubbery material conventional in color and having a relatively low density. A typical and satisfactory formula for the material of these laminations is as follows:

*Low density stock*

| Item: | Percent by wgt. |
|---|---|
| Natural rubber | 88.00 |
| Zinc oxide | 7.50 |
| Benzothiazyl disulfide | .75 |
| Diphenylguanidine phthalate | .25 |
| Stearic acid | .65 |
| Di-beta-naphthyl-para-phenylenediamine | .85 |
| Sulfur | 2.00 |
| | 100.00 |

Sp. gr.=0.985

The thicker striations 10 are alternated with thin striations 11 which may be of any contrasting color such as red or pink and of somewhat higher density. A typical and satisfactory formula for the material of the striations 11 is as follows:

2

*High density stock*

| Item: | Percent by wgt. |
|---|---|
| Natural rubber | 42.50 |
| Zinc oxide | 2.50 |
| Benzothiazyl disulfide | .50 |
| Diphenylguanidine phthalate | .13 |
| Stearic acid | .50 |
| EPC black | 5.00 |
| Litharge | 5.00 |
| Barytes | 42.23 |
| Di-beta-naphthyl-para-phenylenediamine | .50 |
| Sulfur | 1.14 |
| | 100.00 |

Sp. gr.=1.64

It will be seen that the thin striations 11 have a density, as measured by specific gravity, at least .25 greater than that of the thicker striations 10. Hardness is not an entirely satisfactory criterion of density, but in general the thin striations will have an increased hardness of at least 30 units as measured by the Shore hardness tester.

In constructing the composite packing herein disclosed a single striation 10 may be vulcanized with a single thin striation 11 and then cured and permanently bonded together. Then the composite striations thus made may be united by cement or other adhesive and the slab or block thus built up to the desired thickness.

The slab of packing herein shown has an overall thickness of 2¼" and of this approximately 25% is made up of six colored striations 11 of the greater density material, and 75% is made up of seven striations 10 of the less density material. This distribution of the components results in a satisfactory and useful article of commerce.

The term "rubbery material" is employed herein to include synthetic rubbers as well as natural rubbers or combinations of both such materials.

Having thus disclosed my invention and described in detail a preferred embodiment thereof, I claim as new and desire to secure by Letters Patent:

As a new article of manufacture, a composite vibration-dampening laminated body of elastic packing composed of pairs of relatively thick layers of rubber-like materail having a predetermined degree of density bonded to relatively thin layers of rubber-like material having a density considerably greater than said thicker layers, each of said thin layers being bonded to a thick layer throughout their contacting faces and providing indices of thickness at the edges of said body, each composite bonded thick and thin layer being connected to the next composite bonded thick and thin layer by cement whereby one composite layer may be separated from the next adjacent composite layer, and whereby the thinner layers function in the composite packing body effectively to cooperate with the thicker layers in dampening vibrations and to indicate lines at which the composite packing body may be severed into blocks and slabs of different multiples of its thickness containing said thick and thin layers.

References Cited in the file of this patent

UNITED STATES PATENTS

| | | |
|---|---|---|
| 524,162 | Cochrane | Aug. 7, 1894 |
| 748,093 | Pancoast | Dec. 29, 1903 |
| 1,064,022 | Spadone | June 10, 1913 |
| 1,402,872 | Langford | Jan. 10, 1922 |
| 1,560,862 | Roberts | Nov. 10, 1925 |
| 1,588,797 | Mell | June 15, 1926 |
| 1,931,309 | Thompson | Oct. 17, 1933 |
| 1,961,745 | Eckhardt | June 5, 1934 |
| 2,122,246 | Clewell | June 28, 1938 |
| 2,586,275 | Toulmin | Feb. 19, 1952 |